US011886150B2

(12) United States Patent
Avril et al.

(10) Patent No.: US 11,886,150 B2
(45) Date of Patent: Jan. 30, 2024

(54) PUSH BUTTON SYSTEM AND TIMEPIECE COMPRISING THE SAME

(71) Applicant: Meco SA, Grenchen (CH)

(72) Inventors: Herve Avril, Les Breuleux (CH); Samuel Geiser, Bienne (CH)

(73) Assignee: Meco SA, Grenchen (CH)

( * ) Notice: Subject to any disclaimer, the term of this patent is extended or adjusted under 35 U.S.C. 154(b) by 845 days.

(21) Appl. No.: 16/831,931

(22) Filed: Mar. 27, 2020

(65) Prior Publication Data

US 2020/0371479 A1 Nov. 26, 2020

(30) Foreign Application Priority Data

May 23, 2019 (EP) .................................... 19176219

(51) Int. Cl.
*G04B 3/04* (2006.01)
*G04B 37/10* (2006.01)
(Continued)

(52) U.S. Cl.
CPC ........... *G04B 3/048* (2013.01); *G04B 37/106* (2013.01); *G04F 7/0804* (2013.01); *G04F 7/0857* (2013.01); *G04F 8/006* (2013.01)

(58) Field of Classification Search
CPC ........ G04B 3/001; G04B 3/046; G04B 3/048; G04B 37/106; G04F 7/0857; G04F 7/0804; G04F 8/006
See application file for complete search history.

(56) References Cited

U.S. PATENT DOCUMENTS 3,362,153 A * 1/1968 Wenger ................ G04B 37/106 368/290
3,362,154 A * 1/1968 Perret .................. G04B 37/106 368/290
(Continued)

FOREIGN PATENT DOCUMENTS

CH 704 691 A1 9/2012
CH 707 191 A2 6/2014
(Continued)

OTHER PUBLICATIONS

Office Action dated Jan. 5, 2021 in corresponding Japanese Patent Application No. 2020-052427 (with English Translation), 13 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A push button system for activating an actuation member, the system including a button head, a pusher actuator integral with the button head, a first hollow guide member, the pusher actuator being mounted to slide inside the first hollow guide member, the first hollow guide member being intended to be secured to a fixed element relative to the button head and to the pusher actuator, a second hollow guide member arranged in the button head, and a pin mounted to slide inside the second hollow member, and intended to be secured to the fixed element. The pusher actuator has an upper portion provided on the periphery thereof with a collar intended to cooperate with an internal face of the first hollow guide member to guide the pusher inside the member.

15 Claims, 2 Drawing Sheets

(51) Int. Cl.

| | |
|---|---|
| ***G04F 7/08*** | (2006.01) |
| ***G04F 8/00*** | (2006.01) |

(56) References Cited

U.S. PATENT DOCUMENTS

| | | | | |
|---|---|---|---|---|
| 5,043,958 | A * | 8/1991 | Kaelin | G04B 3/048 368/321 |
| 5,299,179 | A * | 3/1994 | Miche | G04B 37/106 368/320 |
| 5,663,934 | A * | 9/1997 | Wenger | G04B 3/048 368/290 |
| 2001/0050884 | A1* | 12/2001 | Wyssbrod | G04B 3/048 368/321 |
| 2004/0090873 | A1 | 5/2004 | Damasko | |
| 2007/0215442 | A1* | 9/2007 | Ozawa | G04B 3/048 200/50.36 |
| 2014/0177404 | A1* | 6/2014 | Briswalter | G04B 37/106 29/896.34 |
| 2018/0046145 | A1* | 2/2018 | Kissling | G04B 3/048 |
| 2020/0125034 | A1* | 4/2020 | Takasawa | G04B 37/106 |
| 2020/0371479 | A1* | 11/2020 | Avril | G04B 3/048 |
| 2020/0393796 | A1* | 12/2020 | Silvant | G04B 3/041 |

FOREIGN PATENT DOCUMENTS

| | | | |
|---|---|---|---|
| CH | 704 691 | A1 | 4/2016 |
| CH | 704 691 | B1 | 4/2016 |
| CH | 710 434 | A2 | 5/2016 |
| CN | 1046396 | A | 10/1990 |
| CN | 1330378 | A | 1/2002 |
| CN | 103885315 | A | 6/2014 |
| CN | 109426133 | A | 3/2019 |
| DE | 27 11 064 | A1 | 9/1977 |
| EP | 0 443 087 | A1 | 8/1991 |
| EP | 1 835 364 | B1 | 12/2008 |
| JP | 52-140079 | U | 10/1977 |
| JP | 55-131910 | A | 10/1980 |

OTHER PUBLICATIONS

Combined Chinese Office Action and Search Report dated Apr. 26, 2021 in Patent Application No. 202010439689.3 (with English language translation and English translation of Category of Cited Documents), 16 pages.

European Search Report dated Nov. 4, 2019 in European Application 19176219.4 filed on May 23, 2019 (with English Translation of Categories of Cited Documents), 5 pages.

* cited by examiner

PUSH BUTTON SYSTEM AND TIMEPIECE COMPRISING THE SAME

CROSS-REFERENCE TO RELATED APPLICATION

This application claims priority to European Patent Application No. 19176219.4 filed on May 23, 2019, the entire disclosure of which is hereby incorporated herein by reference.

FIELD OF THE INVENTION

The invention concerns a push button system for activating an actuation member.

The invention also concerns a timepiece, particularly a watch, comprising the push button system. This type of push button system is generally used to activate and/or deactivate one or more functionalities of a watch.

STATE OF THE ART

In the field of horology, there are known push button systems intended to activate an actuation member arranged inside a case, typically a watch case. Such systems comprise a button head accessible from outside the case and movable in translation with respect to the case, a pusher actuator integral with the button head and mounted to slide through an opening arranged in the case, and a hollow guide member mounted integral with the case and at least partly inserted into said opening arranged in the case and inside which the pusher actuator slides. However, such push button systems are often subject to actuation forces directed in a non-axial direction, which can lead to a risk of jamming the pusher. This type of push button can thus undergo a bending or tilting force outside the sliding axis of the pusher, which may move the actuation axis off centre, thereby increasing the risk of jamming the pusher.

To overcome this drawback, there are also known push button systems wherein, in addition to the first hollow guide member, there is a second hollow guide member for taking up at least part of the operating stresses during actuation of the pusher. Such a push button system is, for example, disclosed in Swiss Patent No CH704691B1. The second hollow guide member is arranged inside the button head, and the system further comprises a pin, mounted to slide inside the second hollow guide member via a sleeve and secured to the case via one of its ends. The second hollow guide member/pin assembly thus makes it possible to mechanically connect the case to the button head to take up part of the operating stresses during actuation of the button head, the latter being able to slide both over the first hollow guide member and over the pin. Such a configuration thus reduces the risk of the pusher jamming, and consequently improves the mechanical reliability of the system.

However, although the push button system proposed in Patent CH704691B1 solves the problem of the pusher jamming, it has a drawback. Indeed, when it is subject to actuation forces directed in a non-axial direction, typically radial forces, the pusher actuator of such a system may bend. This is detrimental to the reliability and overall water resistance of the system, the problem of water resistance being particularly crucial in chronograph watches.

SUMMARY OF THE INVENTION

It is therefore an object of the invention to provide a push button system which makes it possible to reduce or eliminate the risk of the pusher bending, and thereby improves the reliability and sealing of the system.

To this end, the invention concerns a push button system.

Specific embodiments of the push button system are defined in the dependent claims 2 to 12.

Owing to the fact that an upper portion of the pusher actuator is provided on its periphery with a collar intended to cooperate with an internal face of the first hollow guide member, the guide length of the pusher in the first hollow guide member is considerably increased. In other words, the play between the pusher and the first hollow guide member is reduced, without thereby making the pusher hyperstatic. This advantageously makes it possible to stiffen the push button system and thereby reduce the risk of the pusher bending, particularly when the latter is subject to radial forces. In particular, when it is actuated with a radial force of 5 N in accordance with the new water resistance test standard, the pusher can no longer bend. The reliability and overall water resistance of the system are thus improved.

According to a first embodiment of the invention, the collar has a height corresponding to at least 1/25th of the total height of the pusher actuator, the height being measured in the main direction of extension of the pusher.

According to a second embodiment of the invention, the collar has a height corresponding to at least 1/10th of the total height of the pusher actuator, the height being measured in the main direction of extension of the pusher. This second embodiment has the advantage of further reducing or even eliminating the risk of the pusher bending, particularly when the latter is subject to radial forces.

According to a particular technical feature of the invention, the first hollow guide member comprises an upper part adjusted to slide inside a head housing provided in the button head.

According to another particular technical feature of the invention, the pusher actuator is an arbor or a screw mounted to slide through the first hollow guide member and a first end of which is fixed in the bottom of the head housing, the other end being configured to cooperate with the actuation member.

Advantageously, the push button system further comprises at least one means of sealing arranged between the pusher actuator and the first hollow guide member. This improves the water resistance of the system.

To this end, the invention also concerns a timepiece comprising at least one actuation member arranged inside a case, and at least one push button system as described above for acting on the actuation member.

A particular embodiment of the timepiece is defined in the dependent claim 14.

BRIEF DESCRIPTION OF THE DRAWINGS

The objects, advantages and features of the push button system and the timepiece comprising the same, will appear more clearly in the following description, based on at least one non-limiting embodiment illustrated by the drawings, in which.

DETAILED DESCRIPTION OF THE INVENTION

Figure 1:
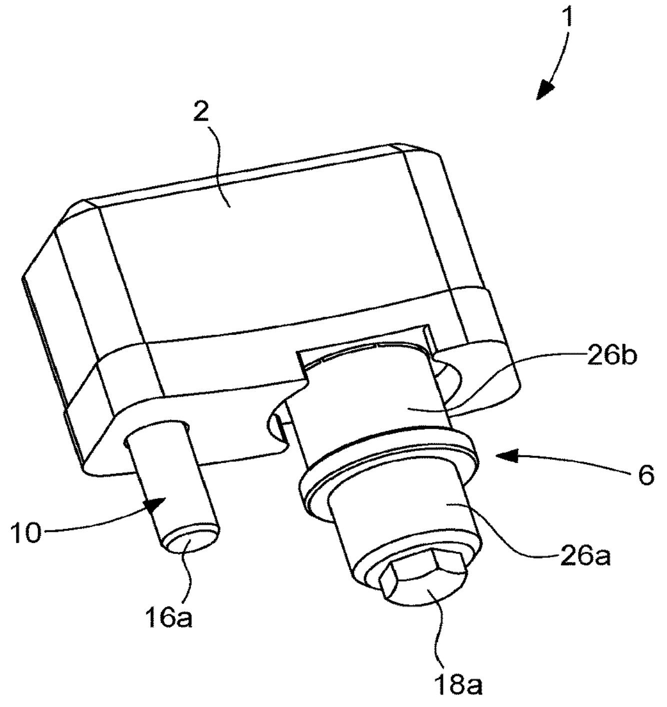
FIG. 1 is a perspective view of a push button system according to the invention.
Figure 2:
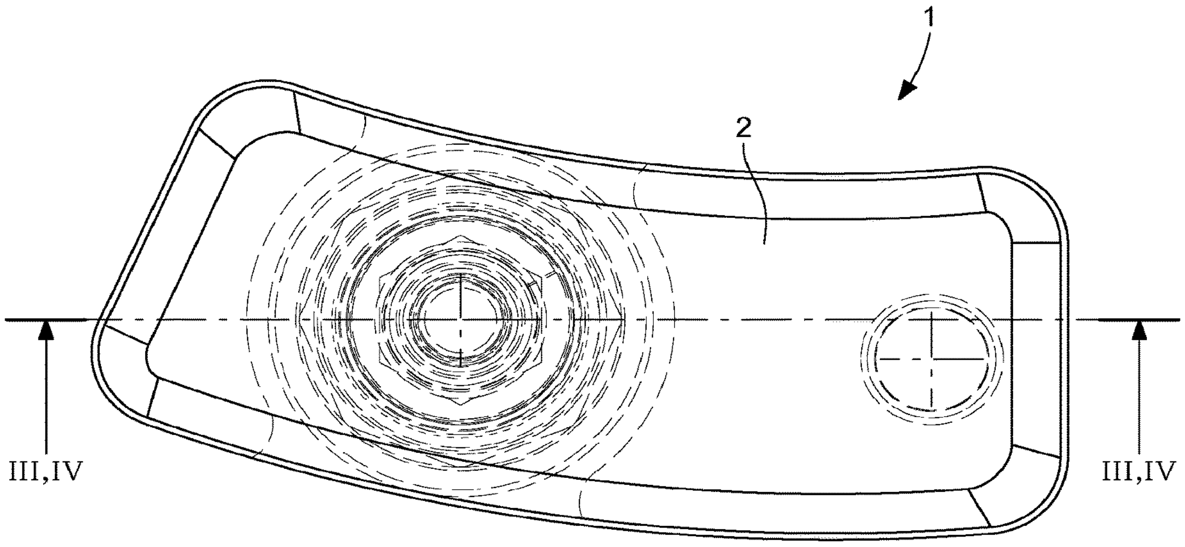
FIG. 2 is a top view of the push button system of FIG. 1.

FIGS. 1 and 2 represent a push button system 1 intended to activate an actuation member. Push button system 1 is, for example, fitted to a watch, particularly a chronograph watch, although this is not limiting in the context of the present invention. In a variant, push button system 1 can be fitted to any type of timepiece or any device provided with a member to be actuated. Such a timepiece or such a device are not represented in the Figures for reasons of clarity. In the case where push button system 1 is fitted to a timepiece, the latter comprises a case, inside which is arranged a timepiece movement and the actuation member on which push button system 1 acts. The actuation member is typically a functional member such as, for example, a chronograph control lever or a switch in the case of application to an electronic watch.

Figure 3:
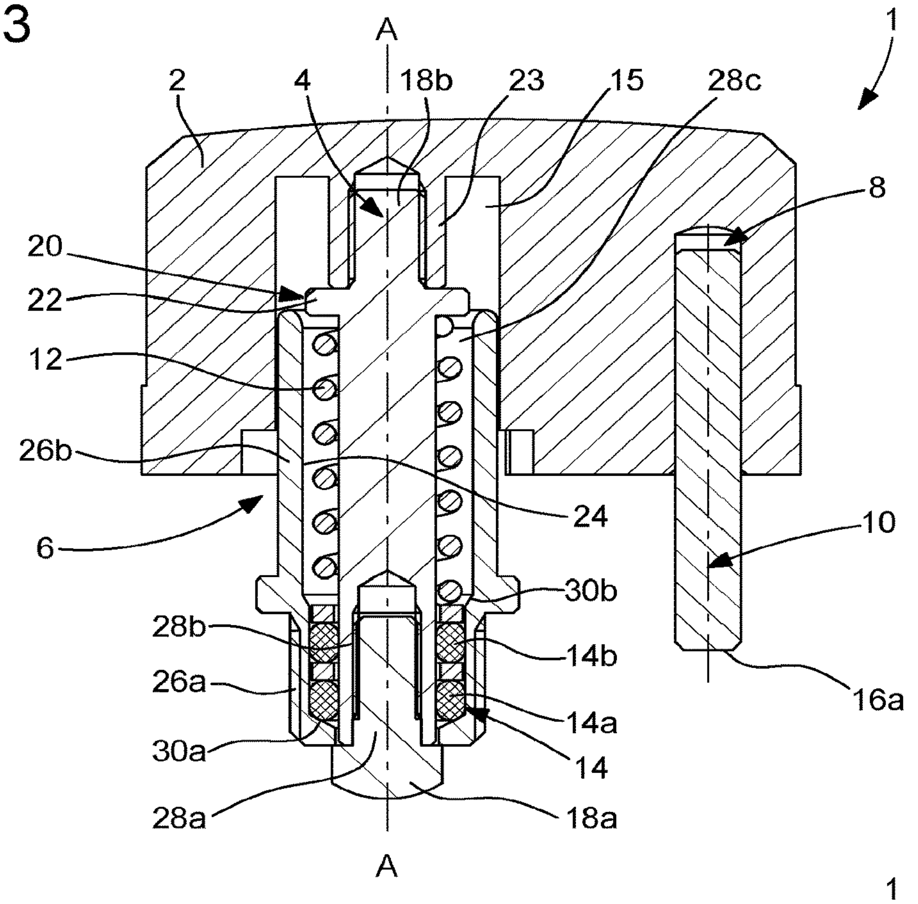
FIG. 3 is a sectional view, taken along a sectional plane III-III, of the push button system of FIG. 2, according to a second embodiment of the invention.
Figure 4:
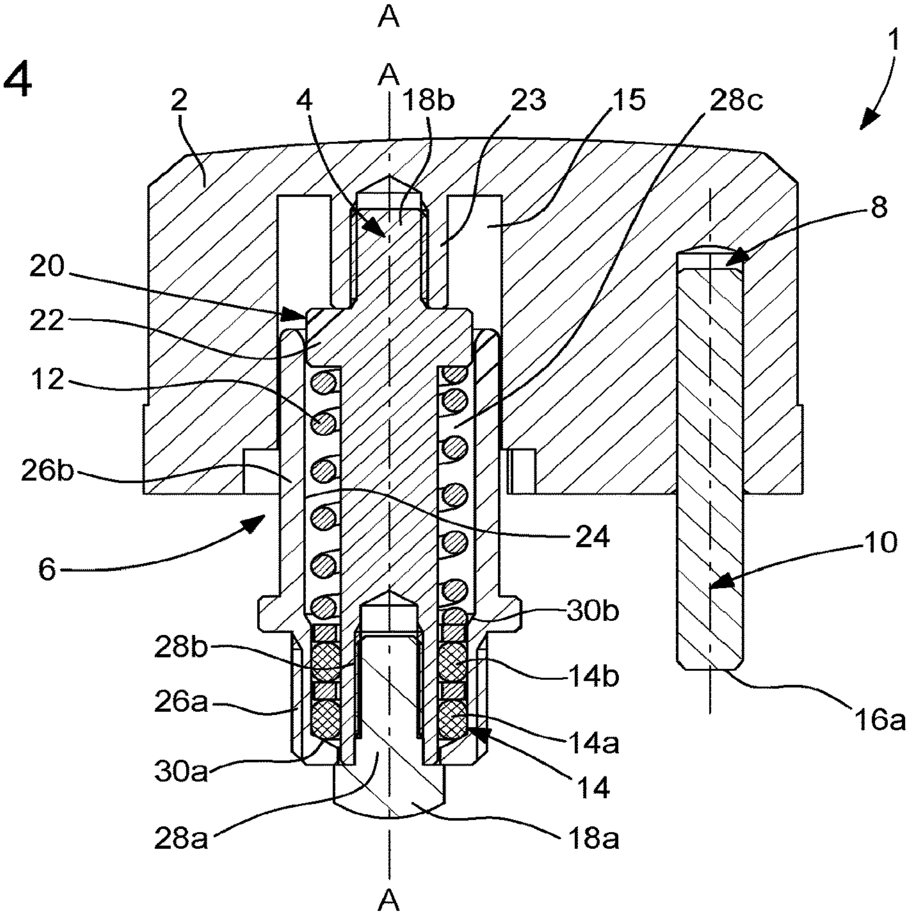
FIG. 4 is a similar view to that of FIG. 3, representing a sectional view of the push button system of FIG. 2 according to a second embodiment of the invention.

Push button system 1 comprises a button head 2, a pusher actuator 4 integral with button head 2, a first hollow guide member 6, a second hollow guide member 8 and a pin 10. Preferably, as illustrated in FIGS. 3 and 4, push button system 1 also comprises a compression spring 12 and at least one means of sealing 14. In the particular embodiments represented in FIGS. 3 and 4, push button system 1 comprises two means of sealing **14*a*, 14*b***.

Preferably, as illustrated in FIGS. 3 and 4, a head housing 15 is provided in button head 2. In the case where push button system 1 is fitted to a timepiece, button head 2 is accessible from outside the case containing the timepiece movement and is movable in translation with respect to the case. In this case, pusher actuator 4 is mounted to slide through an opening arranged inside the case, and first hollow guide member 6 and pin 10 are mounted integral with the case. First hollow guide member 6 is, for example, at least partly inserted into the opening provided inside the case. Pin 10 is, for example, secured to the case via one of its ends **16*a*. End 16*a* is typically a lower end of pin 10**.

Pusher actuator 4 has a lower end **18*a* intended to cooperate with the actuation member. In particular, lower end 18*a* of pusher actuator 4 is configured to enter into contact with the member in question, in order to actuate the latter. As represented in FIGS. 3 and 4, pusher actuator 4 is mounted to slide inside first hollow guide member 6 and has an upper portion 20 provided on the periphery thereof with a collar 22. Preferably, as illustrated in FIGS. 3 and 4, pusher actuator 4 and collar 22 form a single piece of material. The lower end 18*a* of pusher actuator 4 advantageously has a shape adapted, on the one hand, to interact with the actuation member and, on the other hand, to abut on one end of first hollow guide member 6 when button head 2 returns to its stable end-of-travel position, under the effect of compression spring 12**.

Pusher actuator 4 extends in a main direction of extension A-A', which corresponds to the direction of sliding of pusher 4 inside first hollow guide member 6. This direction A-A' also corresponds to the direction of translational movement of button head 2. In the following description, the dimension measured along the main direction of extension A-A' of pusher 4 will be referred to as the 'height'. According to an example embodiment of the invention, and in a non-limiting manner, pusher actuator 4 is an arbor or a screw mounted to slide through first hollow guide member 6 and an upper end **18*b* of which is fixed in the bottom of head housing 15. Upper end 18*b* of pusher actuator 4 is, for example, pressed into a hollow sleeve 23 forming the bottom of head housing 15. In the particular example embodiments illustrated in FIGS. 3 and 4, pusher actuator 4** is an arbor.

Collar 22 is capable of cooperating with an internal face 24 of first hollow guide member 6 to guide pusher 4 inside member 6. Collar 22 extends radially over the periphery of upper portion 20 of pusher actuator 4. In the particular example embodiments of FIGS. 3 and 4, collar 22 has a larger diameter than the diameter of the rest of pusher actuator 4.

In a first embodiment of the invention, collar 22 has a height corresponding to at least $\frac{1}{25}$th of the total height of the pusher actuator. In the illustrative example represented in FIG. 3, collar 22 has a height corresponding to around $\frac{1}{24}$th of the total height of the pusher actuator.

In a second embodiment of the invention, collar 22 has a height corresponding to at least $\frac{1}{10}$th of the total height of the pusher actuator. In the illustrative example represented in FIG. 4, collar 22 has a height corresponding to approximately $\frac{1}{10}$th of the total height of the pusher actuator.

Preferably, and as illustrated in FIGS. 3 and 4, pusher actuator 4 is movably mounted against the return force generated by compression spring 12.

First hollow guide member 6 is intended to be secured to a fixed element relative to button head 2 and to pusher actuator 4. In the particular case where push button system 1 is fitted to a timepiece, the fixed element is the timepiece case, and first hollow guide member 6 is secured to the case, as will be explained in detail below.

According to a particular example embodiment represented in FIGS. 1, 3 and 4, first hollow guide member 6 takes the form of a tube. The tube forming first hollow guide member 6 has a lower outer part **26*a* of reduced diameter, allowing, for example, the insertion thereof into the opening provided in the case; and an upper outer part 26*b* of larger diameter. Preferably upper outer part 26*b* of the tube forming first hollow guide member 6 is adjusted to slide into head housing 15 provided in button head 2. Button head 2 can thus slide over upper outer part 26*b* of first hollow guide member 6, allowing button head 2 to be guided over first hollow guide member 6**.

First hollow guide member 6, delimits, for example, an internal sliding opening **28*a* leading to an internal cylindrical gasket housing 28*b*. Internal cylindrical gasket housing 28*b* leads to an internal cylindrical cavity 28*c*. The diameter of internal cylindrical gasket housing 28*b* is greater than the diameter of internal sliding opening 28*a* and the diameter of internal cylindrical cavity 28*c* is greater than the diameter of internal cylindrical gasket housing 28*b*. This configuration is advantageously obtained by machining. Internal cylindrical gasket housing 28*b* is, for example, delimited by a first shoulder 30*a*, and internal cylindrical cavity 28*c* is delimited by a second shoulder 30*b***.

In the particular case where pusher button system 1 is fitted to a timepiece, first hollow guide member 6 can be force-fitted onto the timepiece case. More specifically, lower outer part **26*a* of first hollow guide member 6 can be pressed into the opening provided in the case, and first hollow guide member 6 can be welded onto the case. Such an assembly process makes it possible to obtain a definitive and water resistant mechanical connection between the case and first hollow guide member 6**.

As illustrated in FIGS. 3 and 4, second hollow guide member 8 is arranged inside button head 2. Preferably, second hollow guide member 8 is a blind hole. Pin 10 is slidably mounted in second hollow guide member 8. Thus, pin 10 is, for example, pressed into second hollow guide member 8. Pin 10 is intended to be secured to a fixed element relative to button head 2 and to pusher actuator 4. In the particular case where push button system 1 is fitted to a timepiece, the fixed element is the timepiece case, and pin 10 is secured to the case via its lower end 16*a*. The second hollow guide member 8/pin 10 assembly can thus at least partly take up operating stresses during the actuation and during the translational movement of button head 2. Button head 2 can slide, on the one hand, over first hollow guide member 6 and, on the other hand, over pin 10.

Compression spring 12 rests, on the one hand, on the bottom of collar 22 and, on the other hand, on first hollow guide member 6. More precisely, according to a particular embodiment example illustrated in FIGS. 3 and 4, compression spring 12 is a helical spring extending around pusher actuator 4 and inside internal cylindrical cavity 28*c*, resting on second shoulder 30*b* on the one hand, and on the bottom of collar 22 on the other.

Each sealing means 14*a*, 14*b* is arranged between pusher actuator 4 and first hollow guide member 6. One of the sealing means 14*a* is, for example, formed of an O ring type seal arranged in the internal cylindrical gasket housing 28*b* resting on first shoulder 30*a*. The other sealing means 14*b* is, for example, formed of a pressure ring type seal arranged in internal cylindrical joint housing 28*b*.

During operation, pressure on the external face of button head 2 compresses compression spring 12 and moves pusher actuator 4 inside first hollow guide member 6. In doing so, collar 22 cooperates with internal face 24 of first hollow guide member 6, guiding pusher 4 inside first hollow guide member 6. The lower end 18*a* of pusher actuator 4 then acts on the actuation member, such as a chronograph control lever or a switch in the case of application to an electronic watch.

It is thus understood that push button system 1 according to the invention allows improved guidance of pusher 4 inside first hollow guide member 6, thereby stiffening the entire assembly and thus reducing the risk of pusher 4 bending, particularly when the latter is subject to radial stresses. The reliability and overall water resistance of system 1 are thus advantageously improved.

The invention claimed is:

1. A push button system intended to activate an actuation member, the system comprising:

a button head including a head housing and a hollow sleeve forming a bottom of the head housing;

a pusher actuator fixed within the hollow sleeve, the pusher actuator having a lower end configured to cooperate with the actuation member;

a first hollow guide member, the pusher actuator being mounted to slide into the first hollow guide member, the first hollow guide member being configured to be secured to a fixed element relative to the button head and to the pusher actuator;

a second hollow guide member arranged in the button head;

a pin mounted to slide into the second hollow guide member, and configured to be secured to the fixed element;

wherein the pusher actuator has an upper portion provided on the periphery thereof with a collar configured to cooperate with an internal face of the first hollow guide member to guide the pusher inside said member, wherein the collar has a larger diameter than the diameter of the rest of the pusher actuator, wherein the first hollow guide member comprises an upper part adjusted to slide inside a head housing and radially outside of the hollow sleeve, and wherein the first hollow guide member comprises a lower part separated from the upper part by a first shoulder, an outer diameter of the upper part is larger than an outer diameter of the lower part, and an outer diameter of the first shoulder is larger than the outer diameter of the upper part.

2. The push button system according to claim 1, wherein the collar has a height corresponding to at least 1/25th of the total height of the pusher actuator, the height being measured in the main direction of extension of the pusher.

3. The push button system according to claim 1, wherein the collar has a height corresponding to at least 1/10th of the total height of the pusher actuator, the height being measured in the main direction of extension of the pusher.

4. The push button system according to claim 1, wherein the pusher actuator and the collar form a single piece of material.

5. The push button system according to claim 1, wherein the pin is pressed into the second hollow guide member.

6. The push button system according to claim 1, wherein the second hollow guide member is a blind hole.

7. The push button system according to claim 1, wherein the pusher actuator is an arbor or a screw mounted to slide through the first hollow guide member and a first end of which is fixed in the bottom of the head housing, the other end being configured to cooperate with the actuation member.

8. The push button system according to claim 7, wherein the pusher actuator is mounted to move against the return force of a compression spring, which rests on the bottom of the collar and on the first hollow guide member.

9. The push button system according to claim 8, wherein the compression spring is a helical spring extending around the pusher actuator.

10. The push button system according to claim 8, wherein the compression spring rests on a second shoulder located within the first hollow guide member and the first and second shoulders overlap in a radial direction.

11. The push button system according to claim 1, wherein the system further comprises at least one means of sealing arranged between the pusher actuator and the first hollow guide member.

12. A timepiece comprising a case in which is arranged a timepiece movement, the timepiece further including at least one actuation member arranged inside the case, and at least one push button system for acting on the actuation member, wherein the push button system conforms to claim 1, the button head being accessible from outside the case and being movable in translation with respect to the case, the pusher actuator being mounted to slide through an opening provided in the case, the first hollow guide member and the pin being mounted integral with the case, the first hollow guide member being at least partly inserted inside said opening provided in the case.

13. The timepiece according to claim 12, wherein the timepiece is a watch.

14. The push button system according to claim 1, further comprising an O-ring seal and a pressure ring seal arranged between the pusher actuator and the first hollow guide member.

15. The push button system according to claim 1, wherein the outer diameter of the first shoulder is larger than a diameter of the head housing of the button head.

* * * * *